May 5, 1953     W. L. WEEKS     2,637,128
MAP HOLDER
Filed Aug. 20, 1952     2 SHEETS—SHEET 1
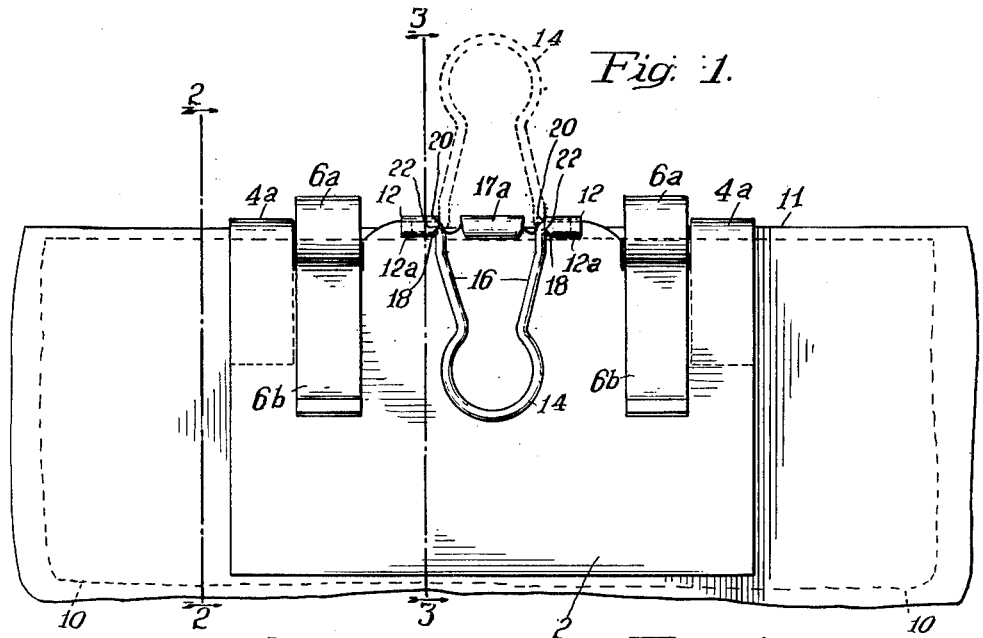
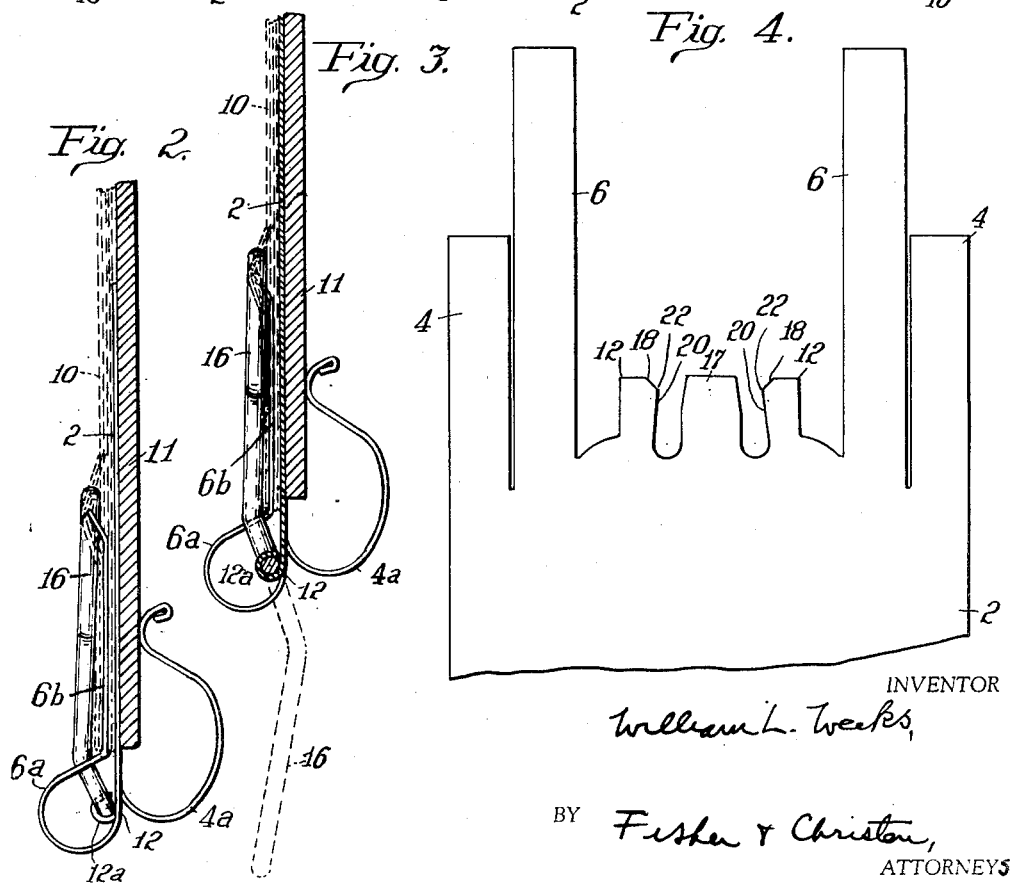
INVENTOR
William L. Weeks,
BY Fisher & Christen,
ATTORNEYS.

May 5, 1953      W. L. WEEKS      2,637,128
MAP HOLDER
Filed Aug. 20, 1952      2 SHEETS—SHEET 2
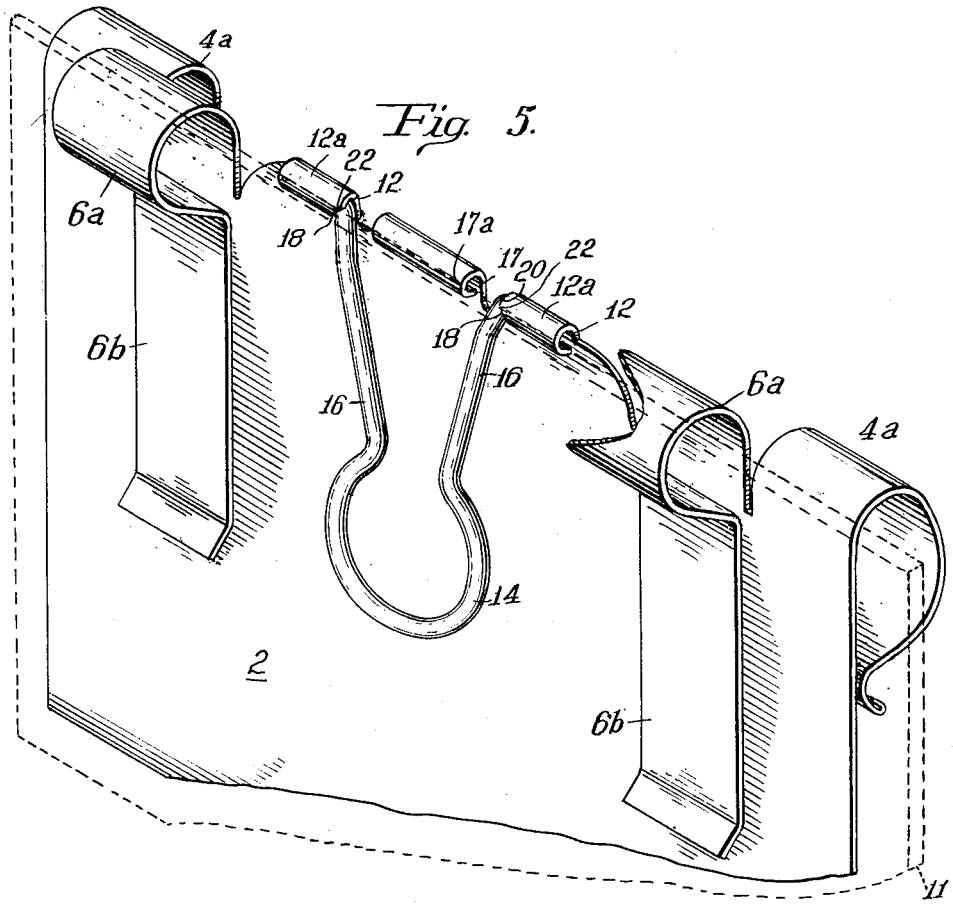
INVENTOR
William L. Weeks,
BY Fisher & Christen,
ATTORNEYS Patented May 5, 1953

2,637,128

UNITED STATES PATENT OFFICE 2,637,128

MAP HOLDER

William L. Weeks, Shawsville, Va.

Application August 20, 1952, Serial No. 305,355

4 Claims. (Cl. 40—13)

This invention is a map holder for mounting a road map or the like in a motor car, so that the map can readily and quickly be inspected by the driver of the car.

The object of the invention is to provide a map holder which can readily be clamped to the usual sun shield or the like in a motor car, so that the map can readily be inspected from time to time as needed and then swung out of the way.

The road map is unfolded so as to present to the driver that area of the map covering the country through which he is traveling and the map is then clipped to the map holder. The map holder is then clamped or clipped to the usual sun shield. A sun shield is usually pivoted to swing to the operative or inoperative positions. The map holder holds the map against the back of the sun shield, when there is no necessity of inspecting the map. When a driver needs to inspect a map, he swings the sun shield and the map carried thereby to bring the map into proper position for inspection. The driver then releases a pivoted clamp which is preferably provided to hold the folded sections of the map. Upon releasing the pivoted clamp, the map unfolds further to reveal further portions of the route to be traveled. After the driver has inspected the map as much as necessary, he refolds the map, secures the folded portions with the pivoted clamp and swings the sun shield (or any other type of shield) upwardly to the inoperative position until he needs to look at it again.

More particularly, the map holder of this invention comprises a base plate, having along one horizontal edge thereof, near each end of such edge, one or more pairs of resilient, reversely curved clips. One clip of each pair is reversely bent around to press against or toward one surface of the base plate, while the other clip of each pair is bent around in the opposite direction to press against or toward the opposite surface of the base plate. The map holder preferably includes a pivoted clamp for securing the map in compact folded position when the map is not in use. The clips on one side hold the base plate to the sun shield or the like, the clips on the other side, hold the top edge portion of the map against the base plate, and the pivoted clamp holds the folded portions of the map in position against the top edge of the map.

The reversely bent clips are preferably integral with the base plate and may be formed by stamping out a blank from sheet metal, plastic or the like, with two extensions extending laterally from one longitudinal edge of the base plate. These extensions are side by side, making them laterally offset. One extension of each pair is reversely bent in one direction, around toward one face of the base plate, while the other extension of each pair is reversely bent in the opposite direction, around toward the opposite face of the base plate.

That edge of the base plate having the reversely bent clips is also provided with a pivoted clamp, spring operated to secure the map in a folded position to the base plate. When the pivoted clamp is released, the map unfolds to reveal further sections of the map, the upper edge being secured to the base plate and sun shield by the reversely bent clips.

Further details of the invention will be described in connection with the accompanying drawings, showing the present and preferred embodiment of the invention.

In these drawings,

Fig. 1 is a plan view of the map holder of this invention, showing the map holder fastened to a sun shield in the downward or operative position.

Fig. 2 is a section on line 2—2 of Fig. 1, showing the sun shield and the holder and map carried thereby in the inoperative position.

Fig. 3 is a section on line 3—3 of Fig. 1, showing the sun shield and the holder and map carried thereby in the inoperative position.

Fig. 4 is a plan view of a portion of the blank from which the map holder is made.

Fig. 5 is a perspective view of the map holder.

Referring now to these drawings, a base plate 2, of sheet metal, plastic or similar suitable material, is stamped out to provide a pair of outer extensions 4 and inner extensions 6, integral with plate 2. The base plate may be formed in any suitable configuration, such as in the form of advertising emblems and the like. The base plate may also carry suitable indicia such as advertising material. One pair of extensions such as 6 is preferably longer than the other, although this arrangement could be reversed.

One pair of extensions 4 is reversely bent to provide resilient clasps 4a, pressed toward one face of the base plate.

The other longer extensions 6 are reversely bent toward the other face of the base plate, to provide a resilient clasp 6a, pressed toward the other surface of the base plate. Clasp 6a is preferably provided with an extended flattened portion 6b, which is pressed toward the base plate.

The pivoted clamp 14 is preferably made of heavy wire, having resilient legs 16. The legs 16 are provided with outwardly extending ends which pivotally engage in trunnions 12a. The trunnions 12a are preferably formed integrally with the base plate, being formed by curling extensions 12 of the blank. The clamp 14 is inserted in the trunnions by squeezing the outwardly extending ends toward each other and releasing them to spring outwardly into the trunnions. The base plate may also be provided with an extension 17 curled into rounded member 17a, for preventing ready release of the legs of the clamp from the trunnions.

The inner edges of extensions 12 are formed to provide cam edges 18 and 20 meeting at a point 22. The adjacent outer edges of resilient legs 16 ride on the cam edges 18 and 20, snapping past point 22. When the clamp is in map clamping position as in Fig. 5, the legs 16 press against cam edges 20 and cause the clamp 14 to press against the map. When the clamp 14 is swung upwardly, the legs snap past point 22, bear against cam edges 18 and hold the clamp 14 in open position.

Alternatively, the pivoted clamp may be urged against the base plate 2 of the holder by means of a spring arrangement (not shown).

The clamp 14 may carry a plate (not shown) in the form of an emblem or the like, particularly for advertising purposes. The emblem may bear suitable indicia.

In use, the sun shield 11 is pivoted downwardly to the lower position and the holder is clipped to the upper edge of the sun shield 11. The road map 10 is then folded to expose the portion of the map showing the desired route, and the upper edge of said folded portion is slipped under the flattened portions 6b of the longer clasps. The map 10 will normally extend a considerable distance below the lower edge of the sun shield 11. The map may be conveniently inspected in this position, the exposed portion indicating the desired route. When the driver no longer needs to look at the map, he folds the portion extending below the sun shield upwardly, preferably in accordion fashion, and secures this folded portion against the shield 11 by means of the pivoted clamp 14. The map is then in a compact position for storage. The shield 11 and the map carried thereby are then swung upwardly about the horizontal axis of the shield to the inoperative position.

Figs. 2 and 3 show the map holder secured to the sun shield 11 together with the map 10 held thereby. The sun shield 11 is shown in the inoperative or storage position. A portion of the map is secured between the clasps 6b and the sun shield 11. A further portion of the map is shown folded against the outside of clasps 6b and secured in place by means of the legs 16 of pivoted clamp 14. Fig. 3 shows the legs 16 of clamp 14 in the released position in dotted lines.

The map holder of the present invention also is adapted to carry a pencil or like in convenient position for use by the driver. Thus a pencil or pen (not shown) may be slipped through the loops of clasps 6a. The pencil or the like is then available for use when the sun shield and map holder carried thereby is in the downward or operative position. Alternatively, a pen or pencil (not shown) may be conveniently carried when the sun shield and map holder is in the inoperative position by inserting said pencil through the loops of clasps 4a.

The resilient clasps 4a may also be used to carry papers such as vehicle registration cards, licenses, identification cards and the like. The papers may be inserted between the end of clasps 4a and the sun shield 11. Such papers may be inserted between the end of clasp 4a and the sun shield 11. Such papers and articles will then be in view when the sun shield is in the inoperative position.

While the invention has been illustrated in detail, it should be understood that the invention is not limited to the precise details shown, but may be carried out in other ways.

I claim as my invention:

1. A map holder or the like, comprising a base plate, a pair of reversely bent resilient clips near each end of one edge of the base plate, one clip of each pair being adapted to press toward one surface of the base plate, the other clip of that pair being adapted to press toward the opposite surface of the base plate, and a pivoted clasp pivoted to said edge of the base plate between the pairs of clips for detachably holding a folded portion of a map against said edge of the base plate.

2. A map holder set forth in claim 1 wherein said resilient clips adapted to press toward one face of the base plate carry loop portions adapted to receive a pencil therein.

3. A map holder or the like comprising a base plate, a reversely curved resilient clip carried by one edge of the base plate and bent around to press toward one face of the base plate, a second reversely curved resilient clip carried by the same edge of the base plate and bent around to press toward the opposite face of the base plate, one of said clips being adapted to fasten the map holder to a motor vehicle sun shield and the other being adapted to hold a map against one side of the base plate, a clamp for detachably holding a folded portion of a map against the map side of the base plate, said clamp being pivotally mounted on the same edge of the base plate which carries said resilient clips, whereby lifting said pivoted clamp will permit a map to be unfolded while one portion thereof is held by said map holding clips.

4. A map holder as set forth in claim 3 wherein a pair of annular trunnions are mounted on the same edge of the base plate for pivotally carrying said clamp and said trunnions are provided with cam edges extending outwardly and towards the map side of the base plate for resiliently bearing against said clamp to force it towards the map side of the base plate.

WILLIAM L. WEEKS.

References Cited in the file of this patent

UNITED STATES PATENTS

| Number | Name | Date |
| --- | --- | --- |
| 187,061 | Snow | Feb. 6, 1877 |
| 349,924 | Crofut | Sept. 28, 1886 |
| 357,893 | Banta | Feb. 15, 1887 |
| 418,420 | North et al. | Dec. 31, 1889 |
| 616,951 | Mensch | Jan. 3, 1899 |
| 788,335 | Shepard | Apr. 25, 1905 |
| 1,815,024 | Foster | July 14, 1931 |
| 1,857,934 | Blackburn | May 10, 1932 |
| 2,127,234 | Reiter | Aug. 16, 1938 |
| 2,306,174 | Mallory | Dec. 22, 1942 |